United States Patent
Croak et al.

(10) Patent No.: US 7,583,794 B1
(45) Date of Patent: Sep. 1, 2009

(54) METHOD AND APPARATUS FOR PROVIDING END-TO-END CALL COMPLETION STATUS

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 854 days.

(21) Appl. No.: 11/018,007

(22) Filed: Dec. 21, 2004

(51) Int. Cl.
*H04M 15/00* (2006.01)
(52) U.S. Cl. ....................... 379/126; 379/139
(58) Field of Classification Search ............ 379/112.01, 379/112.06, 114.14, 126, 127.02, 133, 134, 379/139
See application file for complete search history.

(56) References Cited

U.S. PATENT DOCUMENTS

| | | | |
|---|---|---|---|
| 6,718,023 B1* | 4/2004 | Zolotov | 379/133 |
| 7,231,024 B2* | 6/2007 | Moisey et al. | 379/126 |
| 2003/0185363 A1* | 10/2003 | Cerami et al. | 379/126 |

* cited by examiner

*Primary Examiner*—Binh K Tieu

(57) ABSTRACT

The present invention enables a method for following the state of a call and generating defects as function of call completion success as opposed to discrete events that happen at individual network elements during the call. In one embodiment, the invention uses Call Detail Records (CDR) to analyze the end-to-end completion status to measure per call basis defects instead of using defect codes generated by network elements on a per equipment basis. CDR is data associated with a telephone call, including the calling and the called numbers, the date and timestamp, the duration, the call setup delay, and the final handling code of the telephone call.

6 Claims, 4 Drawing Sheets

METHOD AND APPARATUS FOR PROVIDING END-TO-END CALL COMPLETION STATUS

The present invention relates generally to communication networks and, more particularly, to a method and apparatus for providing end-to-end call completion status in packet-switched networks, e.g., Voice over Internet Protocol (VoIP) networks.

BACKGROUND OF THE INVENTION

Network providers often measure defects in their network to evaluate service quality and availability. Conventional counters of defects sometimes produce data that suggest many more defects than what have actually occurred. For example, when VoIP gateways, such as Border Elements, attempt to use a congested PRI, a defect code is generated even though the call is successfully routed to another PRI for final call completion. Calls being placed over least cost routing mechanisms also can generate false defect codes since a non-least-cost route may have been used instead of the least-cost route to complete the call setup.

Therefore, a need exists for a method and apparatus for enabling end-to-end call completion status in packet-switched networks, e.g., Voice over Internet Protocol (VoIP) networks.

SUMMARY OF THE INVENTION

In one embodiment, the present invention enables a method for following the state of a call and generating defects as function of call completion success as opposed to discrete events that happen at individual network elements during the call. The invention uses Call Detail Records (CDR) to analyze the end-to-end completion status to measure per call basis defects instead of using defect codes generated by network elements on a per equipment basis. CDR is data associated with a telephone call, including the calling and the called numbers, the date and timestamp, the duration, the call setup delay, and the final handling code of the telephone call. The final handling code is the code that indicates whether a call has been completed successfully, blocked or cut off. Defect codes generated during the call setup that are not reflecting the true end-to-end call completion status of a call will be ignored and the final handling code will be used instead.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
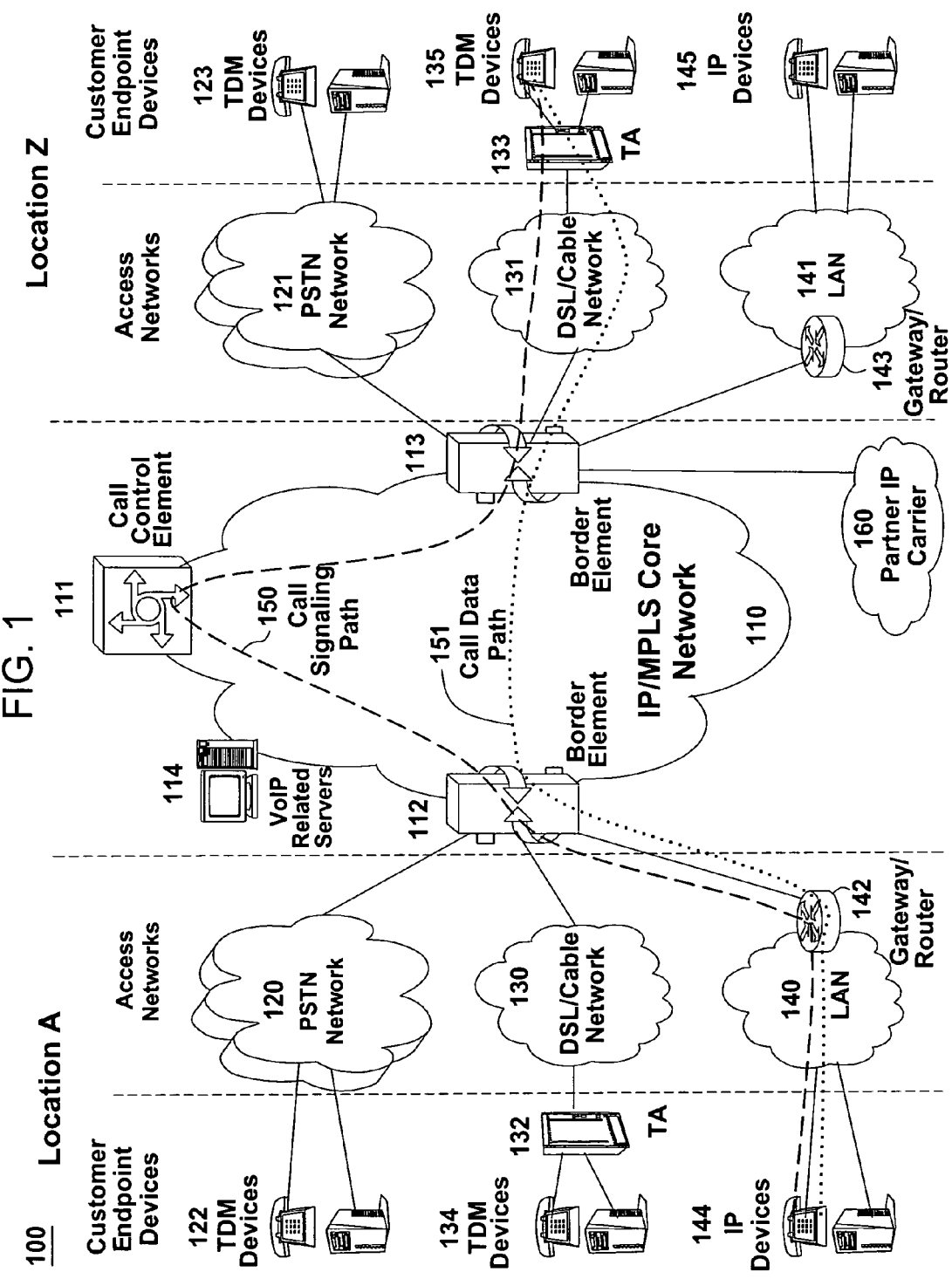
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Network providers often measure defects in their network to evaluate service quality and availability. Conventional counters of defects sometimes produce data that suggest many more defects than what have actually occurred. For example, when VoIP gateways, such as Border Elements, attempt to use a congested PRI, a defect code is generated even though the call is successfully routed to another PRI for final call completion. Calls being placed over least cost routing mechanisms also can generate false defect codes since a non-least-cost route may have been used instead of the least-cost route to complete the call setup.

To address this criticality, the present invention enables a method for following the state of a call and generating defects as function of call completion success as opposed to discrete events that happen at individual network elements during the call. The invention uses Call Detail Records (CDR) to analyze the end-to-end completion status to measure per call basis defects instead of using defect codes generated by network elements on a per equipment basis. CDR is data associated with a telephone call, including the calling and the called numbers, the date and timestamp, the duration, the call setup delay, and the final handling code of the telephone call. The final handling code is the code that indicates whether a call has been completed successfully, blocked or cut off. Defect codes generated during the call setup that are not reflecting the true end-to-end call completion status of a call will be ignored and the final handling code will be used instead.

Figure 2:
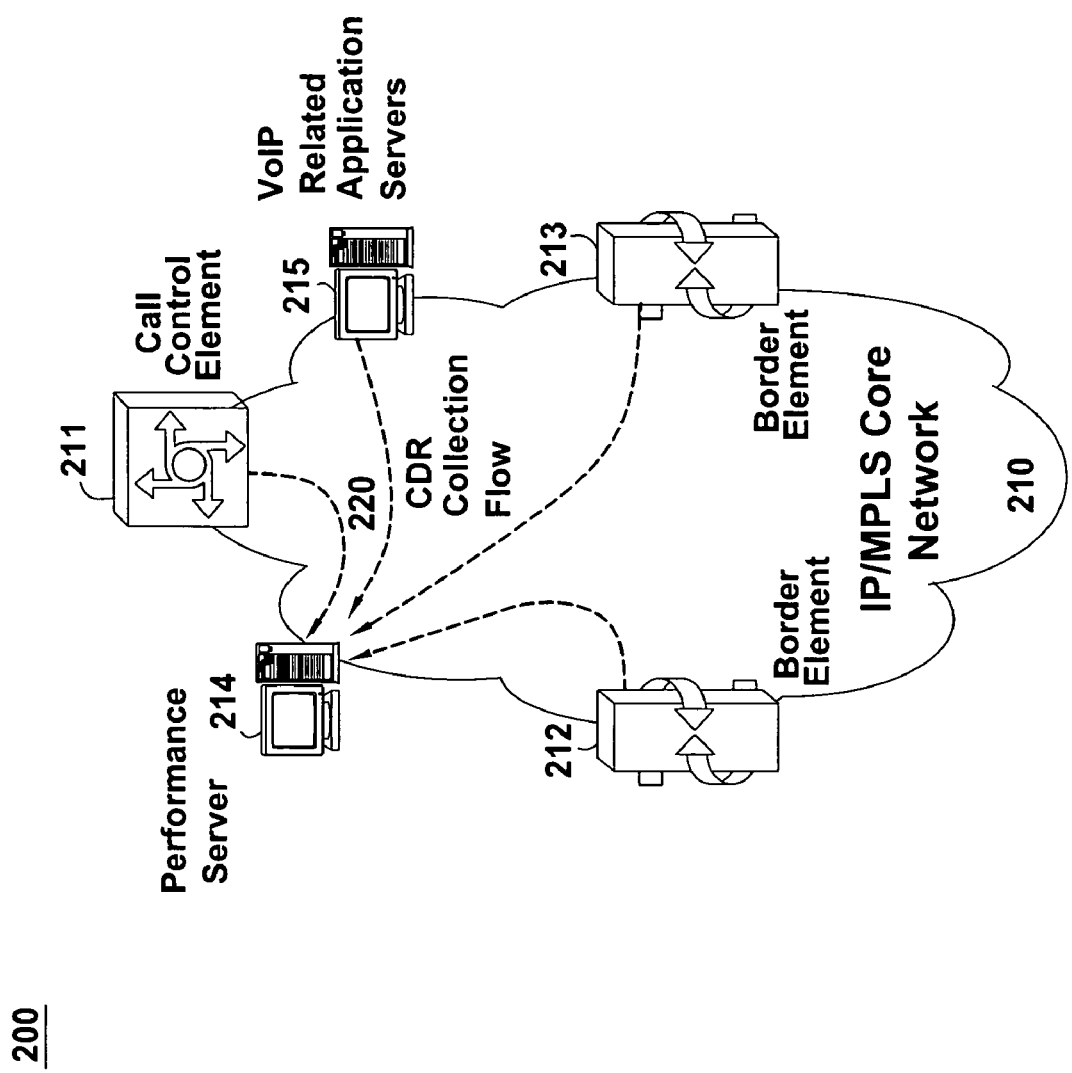
FIG. 2 illustrates an example of collecting CDR data to enable end-to-end call completion status in a VoIP network of the present invention.

FIG. 2 illustrates an example of collecting CDR data to enable end-to-end call completion status in a VoIP network. Various network elements or components in a VoIP network continuously collect per call CDR data for every call processed within the network. These network elements include CCE, BE, and AS. CDR is data associated with a telephone call, including the calling and the called numbers, the date and timestamp, the duration, the call setup delay, and the final handling code of the telephone call. The final handling code is the code that indicates whether a call has been completed successfully, blocked or cut off. Every call made using the VoIP network creates one CDR at each network element involved in the call. A CDR created at BEs 212 and 213 for a particular telephone call contain signaling and media information more related to the edge of the network for the call, while a CDR created at CCE 211 for the same telephone call contains signaling information more related to the core of the network for the call. CDR is created on a per call basis. In other words, there is only one CDR created for a telephone call for each network element involved in the call.

In order to monitor end-to-end call completion status of a call, all network elements within network 200 forward completed CDR data of each call to the Performance Server 214 for further analysis and processing. Flow 220 shows the collected CDR flow from BE 212, BE 213, CCE 211 and AS 215 to PS 214. PS 214 processes and analyzes all collected CDR data from all network elements to provide an end-to-end view of call completion status of each call on a per call basis within the network. Particularly, PS 214 will consolidate all CDR data associated with a particular call to construct the end-to-end completion view of the call. PS 214 will put together CDR data with views from different network elements within the network to construct an end-to-end call completion view of the call. With the end-to-end completion view in place, the call completion data can be presented showing detailed call completion performance reflecting a much more accurate picture of the overall call completion performance. Defect codes generated during the call setup that are not reflecting the true end-to-end call completion status of a call will be ignored and the final handling code will be used instead. In other words, the present invention instead uses the final handling code as an indication or measure of a defect in the communication network, thereby reducing the number of falsely reported defects.

Figure 3:
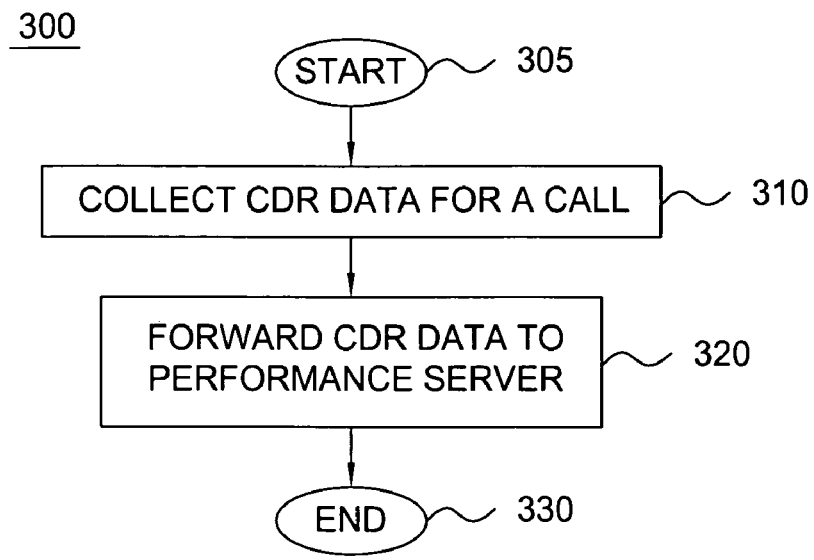
FIG. 3 illustrates a flowchart of a method for collecting end-to-end call completion status in a VoIP network of the present invention.

FIG. 3 illustrates a flowchart of a method for collecting end-to-end call completion status in a VoIP network. The method is executed by all CCEs, BEs, and ASs within the network. Method 300 starts in step 305 and proceeds to step 310.

In step 310, the method collects CDR data associated with a call. Namely CDR data from each and every network components involved in the call will be collected.

In step 320, the method forwards the collected completed CDR data of the call to the PS. Method 300 ends in step 330.

Figure 4:
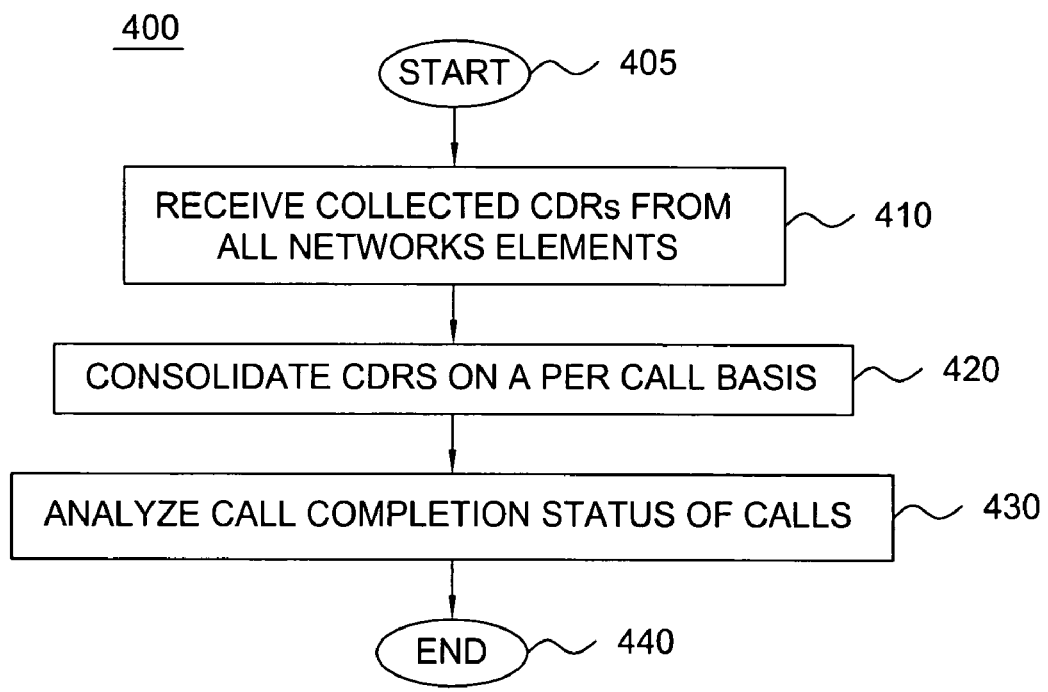
FIG. 4 illustrates a flowchart of a method for consolidating end-to-end call completion status in a VoIP network of the present invention.

FIG. 4 illustrates a flowchart of a method for consolidating CDRs to construct end-to-end call completion status in a VoIP network. The method is performed by the Performance Server. Method 400 starts in step 405 and proceeds to step 410.

In step 410, the method receives CDRs collected by all VoIP network elements within the network. In step 420, the method consolidates related CDRs based on a per call basis. Namely, the method identifies all CDRs associated with a particular call and uses the data with these related CDRs to construct the end-to-end call status view from the beginning of the call to the end of the call.

In step 430, the method uses the end-to-end call status view to decide if the call is completed successfully or provides a reason for the failure of the call if the call has failed. Method 400 ends in step 440.

Figure 5:
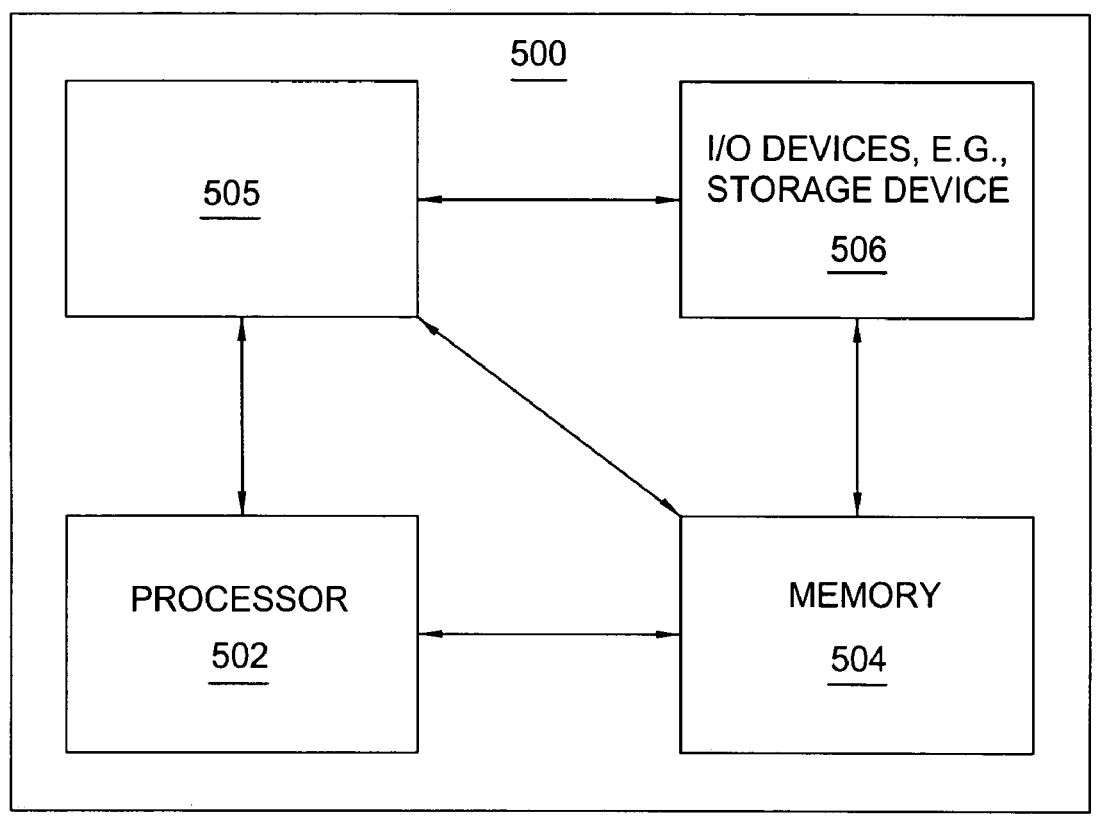
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), an end-to-end call completion status module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present end-to-end call completion status module or process 505 can be loaded into memory 504 and executed by processor 502 to implement the functions as discussed above. As such, the present end-to-end call completion status process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an end-to-end call completion status for a call in a communication network, comprising:
   collecting Call Detail Record (CDR) data from a plurality of network components in said communication network; and
   consolidating said CDR data associated with the call to obtain the end-to-end call completion status for the call, wherein said consolidating comprises:
      combining said collected CDR data on a per call basis for constructing an end to end completion view of the call; and
      extracting a final handling code from said combined CDR data.

2. The method of claim 1, further comprising:
   using said final handling code as an indication of a defect in the communication network.

3. A computer-readable medium having stored thereon a plurality of instructions, the plurality of instructions including instructions which, when executed by a processor, cause the processor to perform the steps of a method for providing an end-to-end call completion status for a call in a communication network, comprising:
   collecting Call Detail Record (CDR) data from a plurality of network components in said communication network; and
   consolidating said CDR data associated with the call to obtain the end-to-end call completion status for the call, wherein said consolidating comprises:
      combining said collected CDR data on a per call basis for constructing an end to end completion view of the call; and
      extracting a final handling code from said combined CDR data.

4. The computer-readable medium of claim 3, further comprising:
   using said final handling code as an indication of a defect in the communication network.

5. An apparatus for providing an end-to-end call completion status for a call in a communication network, comprising:
   means for collecting Call Detail Record (CDR) data from a plurality of network components in said communication network; and
   means for consolidating said CDR data associated with the call to obtain the end-to-end call completion status for the call, wherein said consolidating means comprises:
      means for combining said collected CDR data on a per call basis for constructing an end to end completion view of the call; and
      means for extracting a final handling code from said combined CDR data.

6. The apparatus of claim 5, further comprising:
   means for using said final handling code as an indication of a defect in the communication network.

* * * * *